(12) United States Patent
Chen et al.

(10) Patent No.: US 10,455,312 B1
(45) Date of Patent: Oct. 22, 2019

(54) ACOUSTIC TRANSDUCER AS A NEAR-FIELD MAGNETIC INDUCTION COIL

(71) Applicant: BOSE CORPORATION, Framingham, MA (US)

(72) Inventors: Louis G. Chen, Bolton, MA (US); Kemal Kulovic, Arlington, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/977,498

(22) Filed: May 11, 2018

(51) Int. Cl.
*H04R 1/10* (2006.01)
*H04B 5/00* (2006.01)
*H04R 3/04* (2006.01)

(52) U.S. Cl.
CPC ......... *H04R 1/1016* (2013.01); *H04B 5/0075* (2013.01); *H04R 1/1066* (2013.01); *H04R 3/04* (2013.01)

(58) Field of Classification Search
CPC ........ H04R 1/10; H04R 5/033; H04R 1/1091; H04R 1/106; H04R 25/554; H04R 2225/55; H04W 1/1091
USPC ................. 381/386, 394, 396, 380
See application file for complete search history.

(56) References Cited

U.S. PATENT DOCUMENTS

| 9,742,471 B1* | 8/2017 | Thoen ...................... H04W 4/80 |
| 2007/0149261 A1* | 6/2007 | Huddart ................. H04R 5/033 |
| | | 455/575.2 |
| 2012/0294473 A1 | 11/2012 | Pierce et al. |
| 2015/0201284 A1 | 7/2015 | Park et al. |
| 2018/0035246 A1* | 2/2018 | Orescanin ............ H04R 1/1091 |

FOREIGN PATENT DOCUMENTS

| WO | 2011031910 A1 | 3/2011 |
| WO | 2017008759 A1 | 1/2017 |

OTHER PUBLICATIONS

International Search Report and Written Opinion for International Application No. PCT/US2019/030131 dated Jun. 14, 2019.

* cited by examiner

*Primary Examiner* — Melur Ramakrishnaiah
(74) *Attorney, Agent, or Firm* — Patterson + Sheridan, LLP (57) ABSTRACT

Aspects of the present disclosure provide an electro-acoustic transducer that serves as an acoustic transducer and as an NFMI coil. The use of a single coil eliminates the need for a dedicated NFMI coil, thereby reducing design complexity and cost of production. Circuitry is provided to allow selective filtering of acoustic and NFMI signals so the acoustic and NFMI signals may coexist in a frequency-divisional multiplexing fashion on a same electro-acoustic transducer coil.

19 Claims, 8 Drawing Sheets

ACOUSTIC TRANSDUCER AS A NEAR-FIELD MAGNETIC INDUCTION COIL

TECHNICAL FIELD

Aspects of the present disclosure generally relate to an electro-acoustic transducer configured to provide an audio output and near-field magnetic induction (NFMI) coupling with another electro-acoustic transducer that is also configured to provide an audio output and near field magnetic induction (NFMI) coupling.

BACKGROUND

Various technologies, including Bluetooth® and NFMI, enable true wireless communication between, for example, audio devices such as earphones or earbuds.

Bluetooth®-based audio sharing includes a master acoustic earbud and a slave acoustic earbud. Via a Bluetooth® connection, the master acoustic earbud receives a stream of audio signals from a source device. The master acoustic earbud relays the audio stream to the slave acoustic earbud, also via a Bluetooth® connection. The earbuds decode the audio signals and output the audio signals at each earbud in a synchronized fashion. One example of Bluetooth®-based audio sharing is TrueWireless Stereo available from Qualcomm® Inc. Bluetooth®-based audio sharing is user-friendly in terms of set-up and implementation; however, it suffers from potentially long audio delays. Due to the demands of timing synchronization between earbuds, certain applications may use only one of the acoustic earbuds. As an example, a user making a phone call through certain Bluetooth®-based audio sharing schemes may only hear the audio in a single acoustic earbud (the master acoustic earbud).

NFMI is a short range wireless communication protocol that communicates by coupling a low-power magnetic field between two acoustic earbuds. A transmitter coil in a first acoustic device modulates a magnetic field which is measured by a receiver coil in a second acoustic device. NFMI has less latency as compared to TWS (generally two orders of magnitude less); however, as described above NFMI is implemented using a dedicated coil in each of the first and second acoustic devices. The coils are large and increase the size of acoustic devices.

As the size of acoustic earbuds decreases and as users place increasing importance on industrial design, there is a need to simplify the hardware design of the earbuds to enhance industrial design flexibility.

SUMMARY

All examples and features motioned herein can be combined in any technically possible manner.

Certain aspects provide an apparatus comprising a first acoustic device comprising a first electro-acoustic transducer and a second acoustic device comprising a second electro-acoustic transducer. The first and second electro-acoustic transducers are each configured to acoustically output audio signals and provide near-field magnetic induction (NFMI) coupling of the first electro-acoustic transducer and the second electro-acoustic transducer.

According to aspects, the apparatus further comprises a wireless communication unit configured to communicate with one or more devices external to the apparatus. According to aspects the first acoustic device receives an audio signal from the one or more devices external to the apparatus, processes the received audio signal to produce a first audio signal for output by the first electro-acoustic transducer, and transmits a representation of the received audio signal to the second acoustic device via the NFMI coupling.

According to aspects, processing circuitry at the first acoustic device is configured to convert the received audio signal to NFMI signals, wherein the representation of the received audio signal comprises the NFMI signals and processing circuitry at the second acoustic device is configured to convert the NFMI signals, received via the NFMI coupling, to a second audio signal for output by the second electro-acoustic transducer.

According to aspects, the first and second electro-acoustic transducers each comprise a magnetic coil, and the magnetic coils are configured to transmit audio signals via mechanical vibrations and NFMI signals via magnetic coupling.

According to an aspect, the first and second electro-acoustic transducers are configured to output synchronized audio signals.

According to aspects, the apparatus further comprises a first diplexer filter coupled to the first electro-acoustic transducer and a second diplexer filter coupled to the second electro-acoustic transducer. The first diplexer filter is configured to selectively filter audio signals and NFMI signals so the audio signals and the NFMI signals coexist on a coil of the first electro-acoustic transducer and the second diplexer filter is configured to selectively filter audio signals and NFMI signals so the audio signals and the NFMI signals coexist on a coil of the second electro-acoustic transducer.

Certain aspects provide an apparatus comprises a first earpiece configured to receive audio signals from an external source device, a near field magnetic induction radio (NFMI) radio at the first earpiece configured to convert the received audio signals to NFMI signals, and a first electro-acoustic transducer at the first earpiece and a second electro-acoustic transducer at a second earpiece of the apparatus. The first electro-acoustic transducer is configured to transmit the NFMI signals to the second earpiece of the apparatus via magnetic coupling of the first electro-acoustic transducer and the second electro-acoustic transducer and wherein the first and second electro-acoustic transducers are further configured to output representations of the audio signals via mechanical vibrations.

According to aspects, the apparatus further comprises a filter at the first earpiece configured to high-pass filter the NFMI signals. The first electro-acoustic transducer is configured to transmit the high-pass filtered NFMI signals to the second earpiece of the apparatus via the magnetic coupling.

According to aspects, the apparatus further comprises a first filter at the second earpiece configured to high-pass filter the NFMI signals and an audio codec at the second earpiece configured to convert the high-pass filtered NFMI signals to a first audio signal, wherein the representations of the audio signals comprise the first audio signal. According to aspects, the apparatus further comprises a second filter at the second earpiece configured to low-pass filter the audio signals to generate low-pass filtered audio signals, wherein the representations of the audio signals comprises the low-pass filtered audio signals.

According to aspects, the representations of the audio signals output by the first electro-acoustic transducer are synchronized with the representations of the audio signals output by the second electro-acoustic transducer.

Certain aspects provide a method for outputting audio signals by an apparatus. The method includes receiving audio signals from an audio source device at a first earpiece of the apparatus, converting the audio signals to NFMI signals, transmitting the NFMI signals, by the first earpiece to a second earpiece of the apparatus via near field magnetic induction (NFMI) coupling of a first electro-acoustic transducer at the first earpiece and a second electro-acoustic transducer at the second earpiece, and processing the audio signals at the first earpiece and the received NFMI signals at the second earpiece to produce representations of the audio signals for output at each of the first and second earpieces.

According to aspects, processing at the first earpiece comprises converting the received audio signals to analog audio signals for output by the first electro-acoustic transducer, and selectively filtering the analog audio signals and the NFMI signals so the analog audio signals and the NFMI signals coexist on a coil of the first electro-acoustic transducer.

According to aspects, processing at the second earpiece comprises converting the received NFMI signals to analog audio signals for output by the second electro-acoustic transducer and selectively filtering the analog audio signals and the NFMI signals so the analog audio signals and the NFMI signals coexist on a coil of the second electro-acoustic transducer. According to aspects, the selective filtering comprises passing the analog audio signals and the NFMI signals through a diplexer.

According to aspects, the audio signals comprise signals in a frequency range of approximately 100 Hz to approximately 16 kHz and the NFMI signals comprise signals in a frequency range of approximately 10 MHz to approximately 15 MHz. According to aspects, the audio signals comprise signals in a frequency range of approximately 100 Hz to approximately 16 kHz and the NFMI signals comprise signals in a frequency range of approximately 10 MHz to approximately 15 MHz.

According to aspects, the representations of the audio signals output by the first earpiece are synchronized with the representations of the audio signals output by the second earpiece.

Other features and advantages will be apparent from the description and the claims.

DETAILED DESCRIPTION

Acoustic earbuds that are wirelessly connected to one another, as well as to a source device (e.g., a phone, tablet, or other media player), over respective wireless channels are popular as personal audio devices for various reasons such as aesthetic appeal and ease of use during different types of activities. The popularity of such acoustic systems is in part attributable to the lack of wires connecting the various components of the system, including each of the earbuds and the source device. However, the lack of wired connections creates challenges, such as maintaining quality of the audio signals transmitted between the components, aesthetic appeal, and portability.

Figure 1:
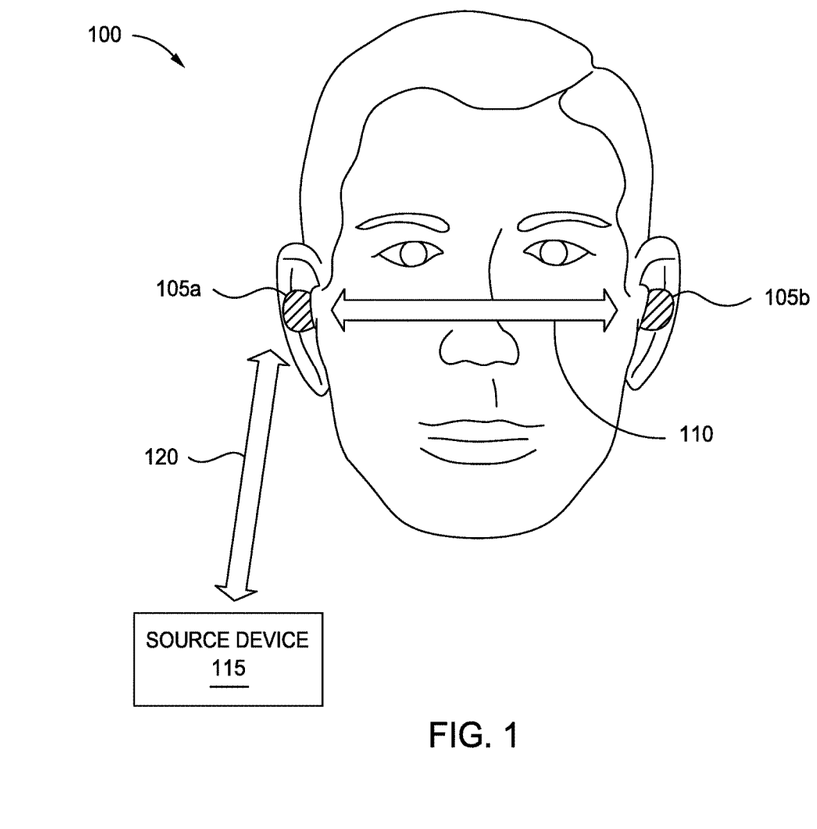
FIG. 1 illustrates an example schematic diagram illustrating signal paths in an example system that includes a set of wireless acoustic earbuds and a source device, in accordance with aspects of the present disclosure.

FIG. 1 illustrates a schematic example of a system 100 including two wireless acoustic earbuds and a source device. The system 100 includes a set of two acoustic earbuds (105a, 105b; 105 in general) that are connected to one another over a wireless link 110. The wireless link 110 may include one or more wireless connections such as an NFMI link and/or a wireless link established in accordance with Bluetooth®, Bluetooth® Low Energy (BLE), Wi-Fi, or another personal area network (PAN) protocol.

At least one of the acoustic earbuds is connected to a source device 115 that generates audio signals to be output by the earbuds 105. The connection between an earbud 105 and the source device 115 can be over a wireless channel 120 such as a Bluetooth® or Wi-Fi link. Because the wireless channel 120 is established over the environment, a latency associated with the channel 120 may depend on various factors such as a physical length of the channel or one or more environmental parameters affecting data transmission over the channel 120. Accordingly, transmitting audio signals separately from the source device 115 to each of the two earbuds 105a and 105b may result in a latency mismatch. In some implementations, the latency mismatch may be addressed by transmitting audio signals to one of the earbuds (105a in the example of FIG. 1), which then transmits or relays at least a portion of the audio signals to the second earbud (105b in the example of FIG. 1), potentially with built-in buffering or delay at the first earbud to enable synchronized playback at both earbuds. This situation is depicted in the example of FIG. 1, where the source device 115 transmits audio signals over the wireless channel 120 to the earbud 105a. The earbud 105a transmits or relays a portion of the received signal to the earbud 105b over the wireless link 110. While relaying the signals from the first earbud 105a to the second earbud 105b may reduce latency as compared to both earbuds receiving the stream from the source device 115, relaying the stream also causes a latency mismatch which may not be suitable for certain applications such as audio for video (A4V) or phone call applications.

The example of FIG. 1 depicts the two earbuds 105a and 105b as discrete in-ear devices; however, the terms earbud, acoustic earbud, and acoustic device as used herein include various types of other personal acoustic earbuds such as in-ear, around-ear or over-the-ear headsets, earphones, and hearing aids. While FIG. 1 illustrates the earbuds 105 as two discrete in-ear acoustics devices, in an example, the earbuds 105 may be physically tethered to each other, for example, by a cord, an over-the-head bridge or headband, or a behind-the-head retaining structure. The tether may be removable such that the earbuds operate wirelessly. Other form factors are possible, including open audio devices that do not directly touch a wearer's ear, but include electro-acoustic transducers on each side of a wearer's head, for example neck-worn or shoulder-worn audio devices, eyeglasses, and other wearable audio devices.

The earbud that receives the signal from the source device 115 is referred to as a master, while the other earbud, which may receive a signal from the master earbud, is referred to as a slave. In some implementations, one of the earbuds always functions as the master while the other earbud always functions as the slave. In other implementations, the master earbud is selected based on one or more criteria such as signal strength from the source device. For example, if a user places the source device (e.g., a smartphone) 115 in his left pocket, the left earbud may receive a stronger signal than the right earbud. Therefore, the left earbud can be selected as the master. If the user puts the source device 115 in the right pocket, or another location where the right earbud receives a stronger signal, the roles of the master and slave may be reversed.

The source device 115 includes any device capable of generating audio signals and transmitting them to the earbuds 105. For example, the source device 115 can be a mobile device such as a smartphone, a tablet computer, an e-reader, or a portable media player. The source device 115 can also be a portable or non-portable media playing device such as a TV, a disk-player, a gaming device, a receiver, or a media streaming device.

The source device 115 includes a transceiver that can establish the wireless channel 120 with one or more of the earbuds 105. In some implementations, the wireless channel 120 is established in accordance with a Bluetooth® Basic Rate/Enhanced Data Rate (BR/EDR) or BLE connections. For brevity, Bluetooth® Basic Rate/Enhanced Data Rate (BR/EDR) is interchangeably referred to herein as Bluetooth®. In some implementations, the wireless channel 120 is established in accordance with another communication protocol such as Near Field Communications (NFC), IEEE 802.11, or other local area network (LAN) or PAN protocols.

Figure 2:
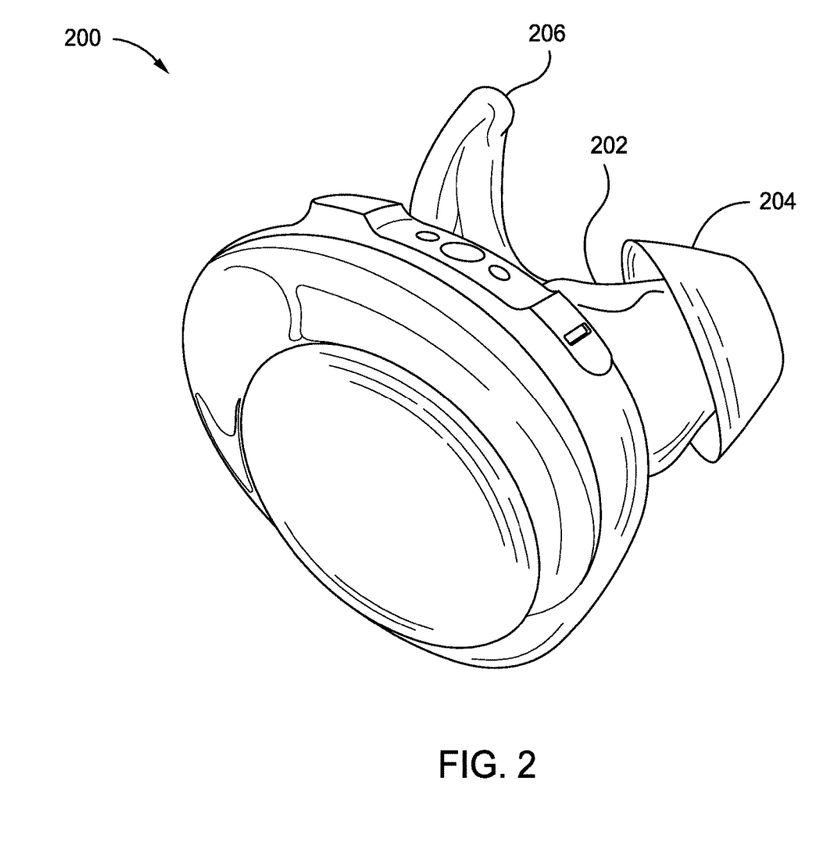
FIG. 2 illustrates an example form factor of the acoustic earbuds illustrated in FIG. 1, in accordance with aspects of the present disclosure.

FIG. 2 illustrates an example form factor 200 of the acoustic earbud 105 illustrated in FIG. 1. In an aspect, the earbud includes a nozzle 202 designed to direct sound towards a user's ear canal. An umbrella-shaped tip 204 creates a gentle seal with a user's ear. A fin 206 is shaped to rest against and apply pressure to a user's antihelix to aid in retaining the earbud in the user's ear. In an example, one or more of the nozzle 202, umbrella-shaped tip 204, and fin 206 are made of a flexible, sweat-resistant material.

As described above, NFMI achieves a lower latency between acoustic earbuds when compared to other wireless audio sharing technologies, such as Bluetooth®. However, NFMI requires a transmitter coil at a transmitting device and a receiving coil at a receiving device. The coils modulate a magnetic field between the earbuds that travel through and around the user's head. A modulated signal is sent out from the transmitter coil in the form of a magnetic field. The magnetic field induces voltage on the receiving coil which is output via an NFMI receiver coil. Thus, dedicated inductor coils in the both transmitter acoustic earbud and the receiver acoustic earbud are necessary for NFMI communications.

Due to the need and orientation of NFMI coils, products incorporating NFMI technology require dedicated space and volume to accommodate the NFMI coils. The NFMI coils consume a significant proportion of space in small form factor earbuds, such as the earbuds illustrated in FIG. 2. Accordingly, the use of NFMI coils compromise the industrial design, mechanical stability, in-ear comfort, and portability of earbuds.

Aspects of the present disclosure address these issues by using an existing electro-acoustic transducer coil in the earbud as an NFMI coil. Generally, an apparatus includes a first and second acoustic device (e.g., first and second earbuds). Each of the acoustic devices includes an electro-acoustic transducer. The electro-acoustic transducers are configured to provide (1) audio output by the first and second acoustic devices and (2) NFMI coupling of the electro-acoustic transducers for NFMI transmission and reception.

As will be described in more detail with respect to FIGS. 4 and 5, the first and second acoustic devices communicate via an NFMI link established between the electro-acoustic transducers at each of the devices. Accordingly, the first acoustic device (e.g., the master earbud) can relay representation of audio signals (which may be wirelessly received from an audio source) encoded into an NFMI stream via its electro-acoustic transducer to the electro-acoustic transducer of the second acoustic device (e.g., the slave earbud). The second acoustic device can process the received NFMI signals to output a representation of the audio stream received from the audio source. The relayed signals may be electromagnetic signals (e.g., radio frequency signals) that may be transmitted over a magnetic field created via coupling of the electro-acoustic transducers at each of the first and second acoustic devices. The second acoustic device converts the received electromagnetic signals into acoustic signals. The signals transmitted over the magnetic field travel through and around the user's head from one earbud to the other earbud. The electro-acoustic transducers in each of the earbuds serve as an antenna to transmit or receive signals via magnetic coupling.

Using the existing electro-acoustic transducers in each earbud for providing audio output and NFMI coupling eliminates the need for the conventionally dedicated NFMI coil in each of the earbuds. The elimination of a dedicated NFMI coil simplifies the mechanical design, allows smaller form factors of an earbud, and reduces the cost of the earbuds. Because the electro-acoustic transducers serve a dual purpose for outputting acoustic signals and NFMI coupling between earbuds, methods are performed to reduce interference between the acoustic signals and NFMI signals. As an example, filtering circuitry separates the acoustic signal from the NFMI signal for further processing.

Figure 3:
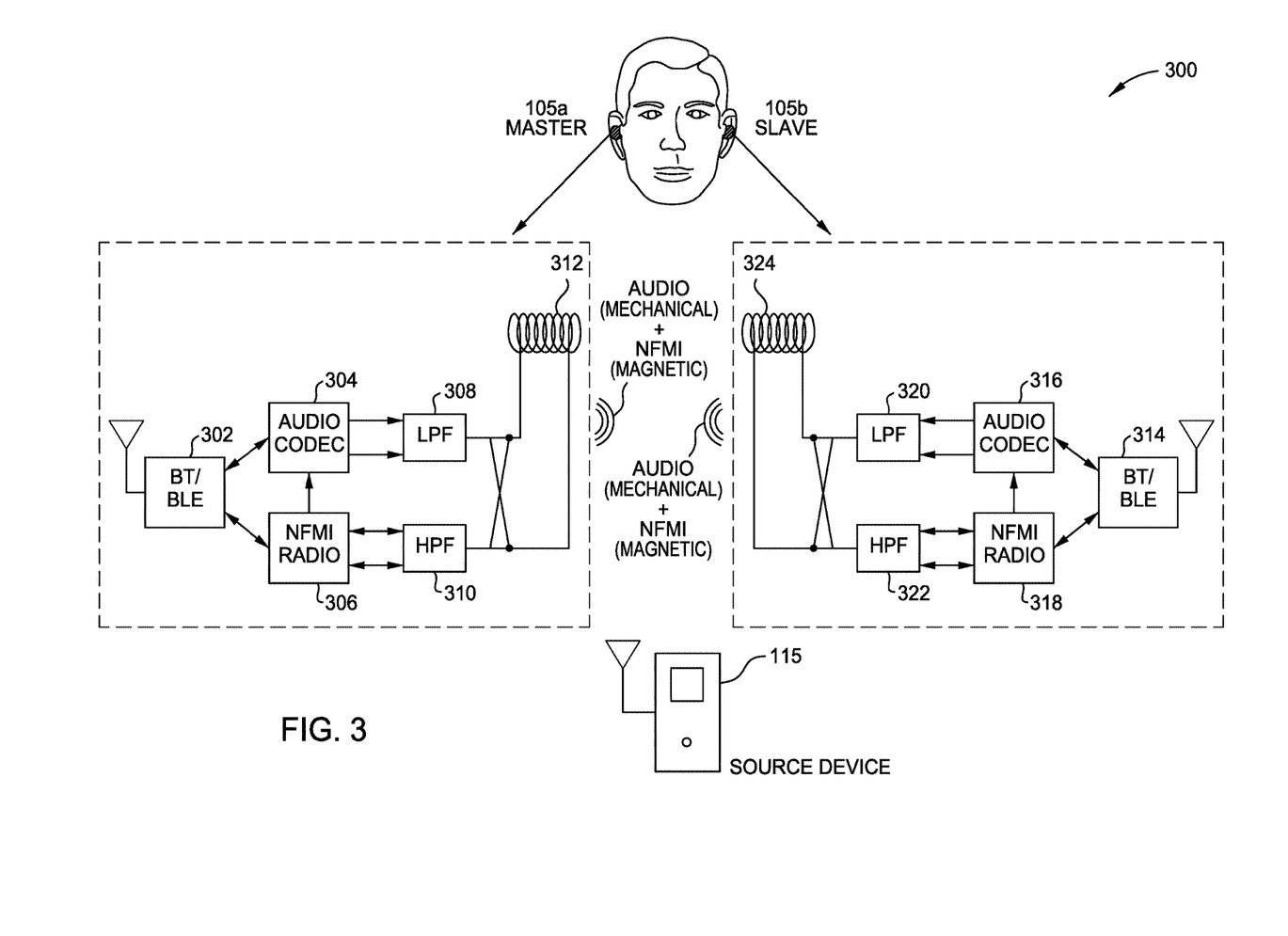
FIG. 3 illustrates example components in a set of acoustic earbuds, in accordance with aspects of the present disclosure.

FIG. 3 illustrates an example of system 300 including a source device 115, a first acoustic device 105a, and a second acoustic device 105b. In an example, the first acoustic device 105a is the master acoustic earbud and the second acoustic device 105b is the slave acoustic earbud.

In the master acoustic device 105a, a wireless communication unit such as a Bluetooth®/BLE chip 302 receives a digital audio stream via a Bluetooth connection with the source device 115. The chip 302 imposes a delay on the received digital audio stream for playback of the audio stream and to synchronize the audio stream at the master acoustic device 105a with audio stream output at the slave acoustic device 105b. According to an example, the master acoustic device 105a receives the digital audio stream using one of the Advanced Audio Distribution Profile (A2DP) or Hands-Free Profile (HFP).

Components of the master acoustic device process the received audio stream to create representations of the audio stream that is output by the electro-acoustic transducer. For example, the audio codec 304 converts the received digital audio stream to an analog audio stream. While the audio codec 304 is illustrated as a separate component in the master acoustic device 105a, in certain implementations, the audio codec 304 may be part of the Bluetooth®/BLE chip 302.

The analog audio stream passes through a low pass filter 308. The low pass filter ensures that the audio stream is selected and signals having higher frequencies than an audio stream are attenuated. The analog audio stream is received by the electro-acoustic transducer coil 312, which outputs the analog audio stream via mechanical vibrations at the master acoustic device 105a. The analog audio stream is a representation of the audio stream received from the source device.

Another representation of the received audio stream is created by the NFMI radio 306, which processes a copy of the digital audio stream received by the master acoustic device 105a from the source device 115. The NFMI radio encodes the digital audio stream into an NFMI stream. The high pass filter 310 allows the higher-frequency NFMI steam to pass through to the electro-acoustic transducer 312 and attenuates signals having lower frequencies than the NFMI stream. The electro-acoustic transducer 312 at the master acoustic device 105a transmits, via magnetic coupling with the electro-acoustic transducer 324 at the slave device 105b, the NFMI stream.

The slave acoustic device 105b may include similar components as the master acoustic device 105a. The electro-acoustic transducer 324 at the slave acoustic device 105b couples with the electro-acoustic transducer 312 at the master acoustic device 105a to receive the NFMI stream transmitted by the master acoustic device 105a. The NFMI stream is a representation of the audio signal received by the master acoustic device 105a from the source device.

The high pass filter 322 selectively filters out low-frequency signals and allows the NFMI stream to pass. The NFMI radio 318 relays the filtered NFMI stream to the audio codec 316. The audio codec 316 processes the NFMI stream by converting the NFMI stream to an analog audio stream. The audio codec 316 applies equalization to the frequency components of the audio stream. The low pass filter 320 selectively filters out high-frequency signals and allows the audio stream to pass. The electro-acoustic transducer 324 outputs representations of the audio stream via mechanical vibrations.

As illustrated, the slave acoustic earbud 105b includes a Bluetooth®/BLE chip 314. The Bluetooth®/BLE chip 314 may be in a standby state at the slave acoustic device 105b. Because, in certain implementations, the roles of the master acoustic device and the slave acoustic device may be interchangeable, the Bluetooth®/BLE chip 314 may enter an active mode when the acoustic device 105b acts as the master acoustic device and receives an audio stream from the source device 115. According to an aspect, when the roles of the master and slave acoustic device are not interchangeable, the slave acoustic device may not include a Bluetooth®/BLE chip 314.

While the audio codec 316 is illustrated as a separate component in the slave acoustic device 105b, in certain implementations, the audio codec 316 may be part of the Bluetooth®/BLE chip 314.

The filtering configuration of the acoustic devices illustrated in FIG. 3 allows acoustic signals and NFMI signals to be separated and enables acoustic signals to be processed by the audio codec and NFMI signals to be processed by the NFMI radio. Acoustic signals typically operate in a frequency range approximately between 100 Hz and 16 kHz. NFMI signals typically operate in a frequency range approximately between 10 MHz and 15 MHz. Due to the spectral separation in operational frequency of three orders of magnitude, a high pass filter and a low pass filter (as illustrated in FIG. 3) enable the coexistence of the acoustic signals and the NFMI signals on the same electro-acoustic transducer coil. The electro-acoustic transducer coil enables frequency-division multiplexing access (FDMA) of the acoustic signals and the NFMI signals.

In another example, a diplexer is used in place of the high-pass filter and the low-pass filter. The diplexer filter at each of the acoustic devices is configured to selectively filter audio signals and NFMI signals so they can both coexist at each of the electro-acoustic transducer coils. The diplexer allows the acoustic signals and the NFMI signals to be separated and processed. In another example, the filters may include one or more inductors and capacitors implementing the function of high and low pass filters.

To enable NFMI power transfer efficiency, the electro-acoustic transducers have a self-resonance frequency at least three times the NFMI operation. Each of the electro-acoustic transducers 312 and 324 are positioned closer to the ear canal of the user's ear as compared to the Bluetooth®/BLE chips 302 and 314. Therefore, when the acoustic devices are positioned in respective ears of the user, the electro-acoustic transducers are located closer to each other, enabling propagation of a magnetic field around and through the user.

Figure 4:
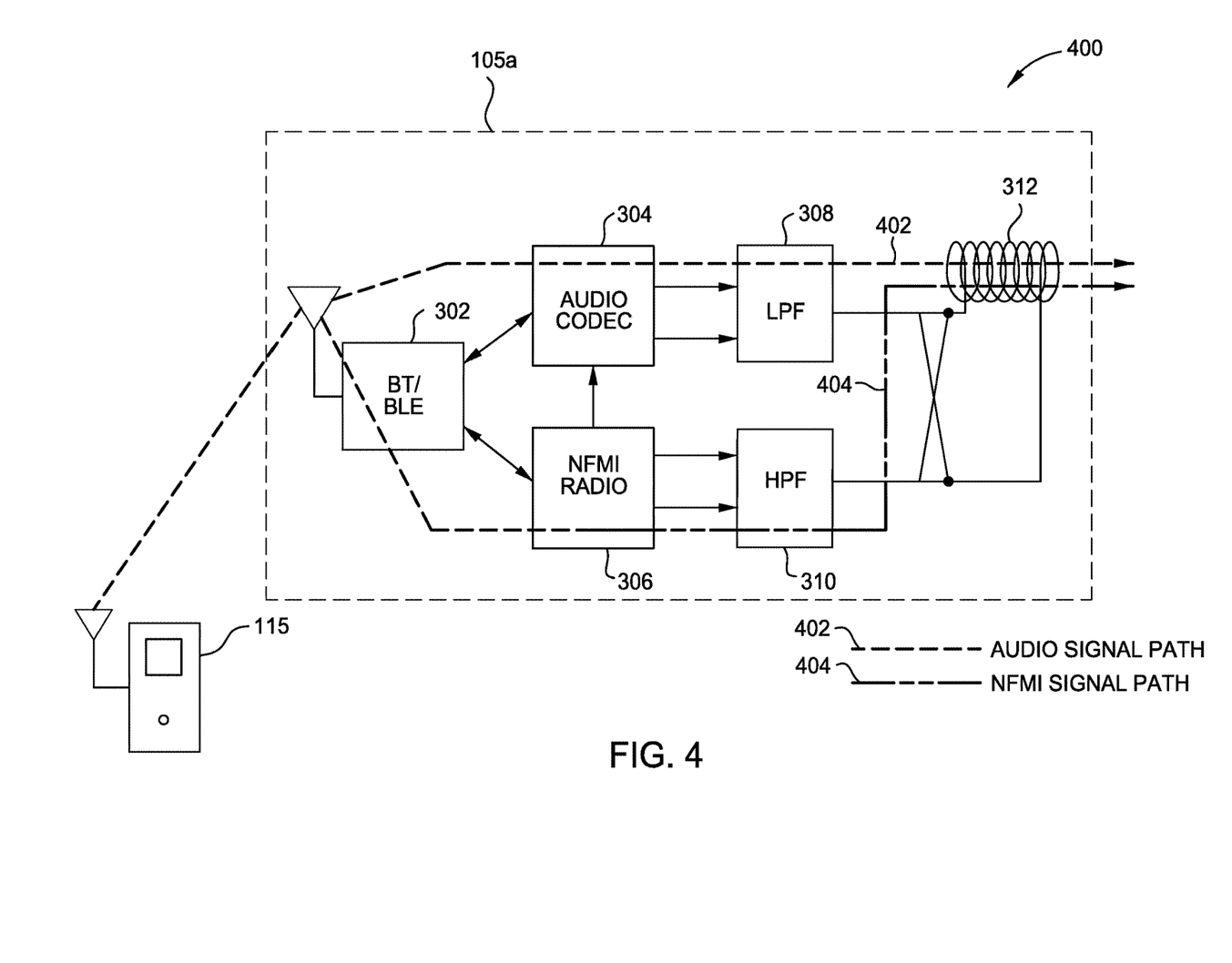
FIG. 4 illustrates example signal paths of an audio stream and an NFMI stream at a master acoustic earbud, in accordance with aspects of the present disclosure.

FIG. 4 illustrates an example signal flow 400 for a master acoustic device 105a receiving an audio stream from a source device 115. Path 402 illustrates a path of an audio stream and path 404 illustrates a path of an NFMI stream.

The master acoustic device 105a may be coupled to a source device 115 over a wireless link. A digital audio stream is transmitted by the source device 115 over a Bluetooth connection with the master acoustic device 105a. As described above with reference to FIG. 3, the Bluetooth®/BLE chip 302 receives the digital audio stream, and imposes a delay to synchronize audio playback with the audio output of the slave acoustic device 105b. As shown on path 402, the digital audio stream is processed by the audio codec 304 to convert the digital audio stream into an analog audio stream and to equalize the audio stream. The audio stream passes through a low pass filter 308 which ensures frequencies relevant to the audio stream are selected. Next, the filtered audio stream passes to the electro-acoustic transducer 312. The electro-acoustic transducer 312 produces an audio stream, which is a representation of the received digital audio stream, via mechanical vibrations.

The Bluetooth®/BLE chip 302 creates a copy of the received digital audio stream for the NFMI radio 306. The copy of the digital audio stream is processed by the NFMI radio 306 to encode the audio stream into an NFMI stream. As shown on path 404, the NFMI stream passes through the high pass filter 310 to ensure frequencies relevant to the NFMI stream are selected. Next, the NFMI stream is passed to the electro-acoustic transducer 312 and is transmitted, via magnetic coupling, to the slave acoustic device 105b.

Figure 5:
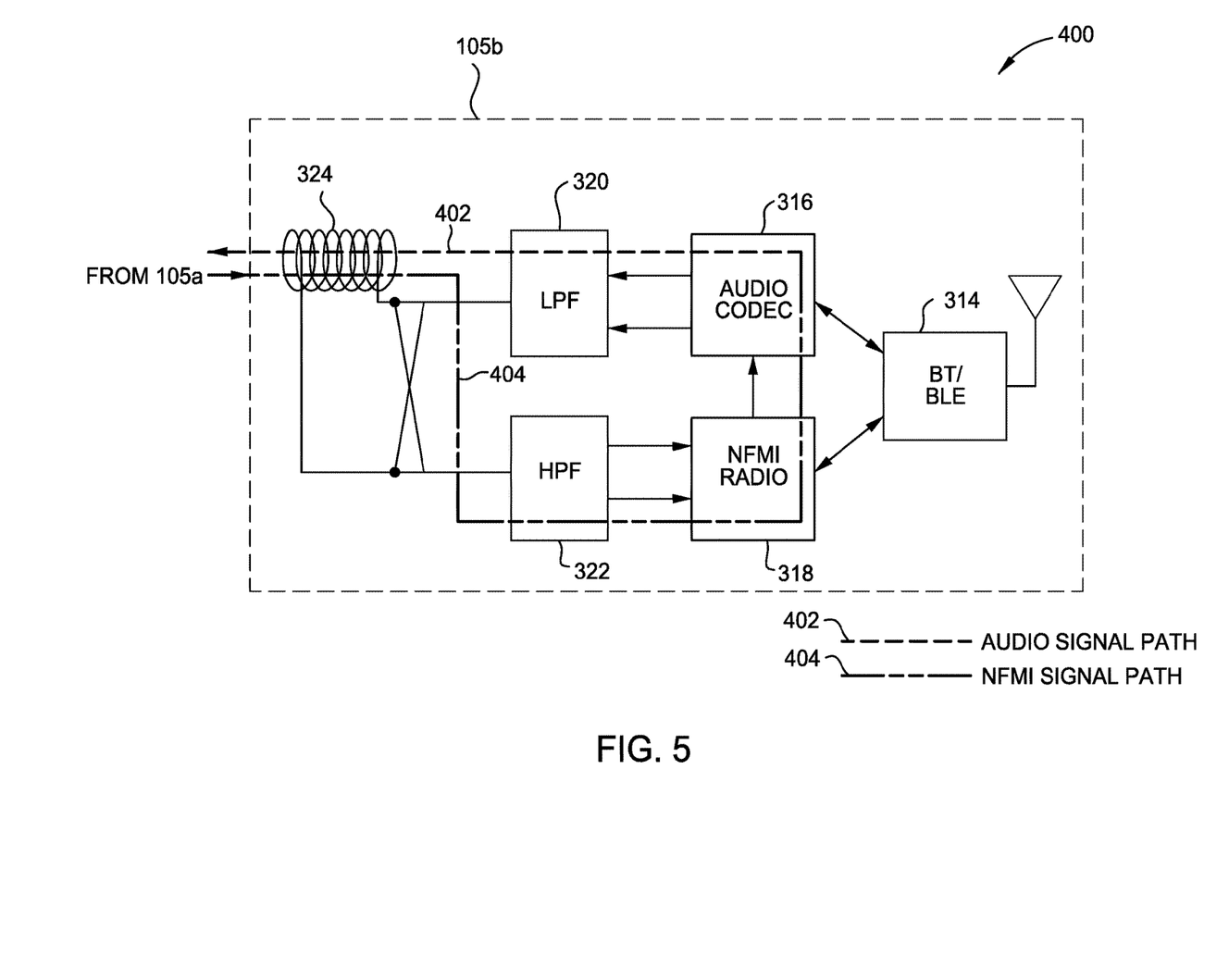
FIG. 5 illustrates an example signal path of a received NFMI stream that is converted to an audio stream at a slave acoustic earbud, in accordance with aspects of the present disclosure.

FIG. 5 illustrates an example signal flow 500 for a slave acoustic device 105b receiving an NFMI stream from a master acoustic device 105a. Path 402 illustrates a path of an audio stream and path 404 illustrates a path of an NFMI stream.

The electro-acoustic transducer 324 at the slave acoustic device 105b couples with the electro-acoustic transducer 312 at the master acoustic device 105a to form a magnetic field in which the NFMI stream is transmitted by the master acoustic device 105a and received by the slave acoustic device 105b. As shown on path 404, the received NFMI stream passes through the high pass filter 322 to ensure frequencies relevant to the NFMI stream are selected. The filtered NFMI stream is processed by the NFMI radio 318. In an example, the NFMI radio 318 imposes a delay to synchronize playback at the master and slave acoustic devices. The audio codec 316 converts the NFMI stream to an analog audio stream. The audio code 316 equalizes frequency components of the analog audio stream.

As shown at path 402, the audio stream is input into the low pass filter 320 to ensure frequencies relevant to audio stream are selected and are input to electro-acoustic transducer 324. The electro-acoustic transducer 324 produces an audio stream output via mechanical vibrations. The audio stream output by the electro-acoustic transducer is a representation of the audio stream received by the master acoustic device 105a.

Based, at least in part to the delay introduced at by the Bluetooth®/BLE chip 302 at the master acoustic device 105a and the delay introduced at the NFMI radio 318 at the slave acoustic device 105b, the acoustic devices output synchronized audio streams.

Figure 6:
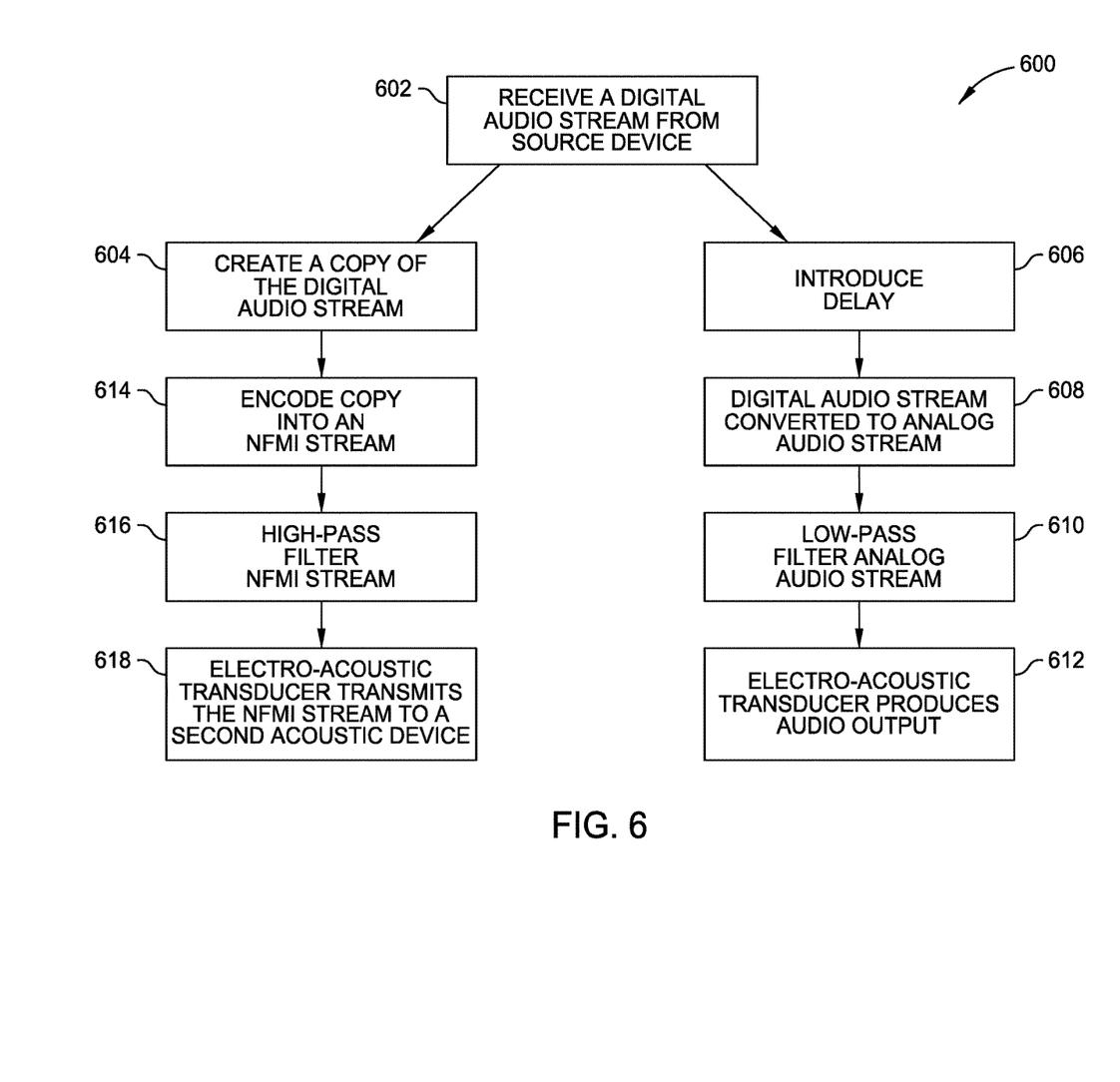
FIG. 6 illustrates example operations performed by a master acoustic earbud including an electro-acoustic transducer configured to process an audio stream and an NFMI stream, in accordance with aspects of the present disclosure.

FIG. 6 illustrates a flowchart of example operations 600 performed by an acoustic device having a single electro-acoustic transducer for processing acoustic signals and NFMI signals.

At 602, the acoustic device receives a digital audio stream from an external, source device. In one example Bluetooth®/BLE chip 302 receives the digital audio stream. The operations performed to process the audio stream (606-612) and the operations performed to process an NFMI stream (604, 614-618) may be performed in two paths.

For audio stream processing, at 606, the acoustic device introduces a delay on the received digital audio stream. The delay is imposed so that audio output by the acoustic device, associated with received digital stream, is synchronized with audio output by another acoustic device. Both audio outputs are representations of the received digital audio stream received from the source device.

At 608, the received digital audio stream, with the imposed delay, is processed by an audio codec and converted into an analog audio stream. At 610, the analog audio stream is low-pass filtered to suppress out-of-audio-band interference and selectively enable the audio stream to pass. At 612, the filtered analog audio stream is passed to the electro-acoustic transducer and the electro-acoustic transducer produces the audio output via mechanical vibrations. The audio output may be synchronized with audio output by a second acoustic device.

For NFMI stream processing, at 604, the acoustic device creates a copy of the received digital audio stream. At 614, the copy of the received digital audio stream is processed by an NFMI radio to encode the digital signal into an NFMI stream. At 616, the NFMI stream is high-pass filtered to suppress the out-of-NFMI-band interference and selectively enable the NFMI stream to pass. At 618, the high-pass filtered NFMI stream is passed to the electro-acoustic transducer and NFMI stream transmitted to the second acoustic device via magnetic coupling between the electro-acoustic transducers a both of the first and second acoustic devices.

Figure 7:
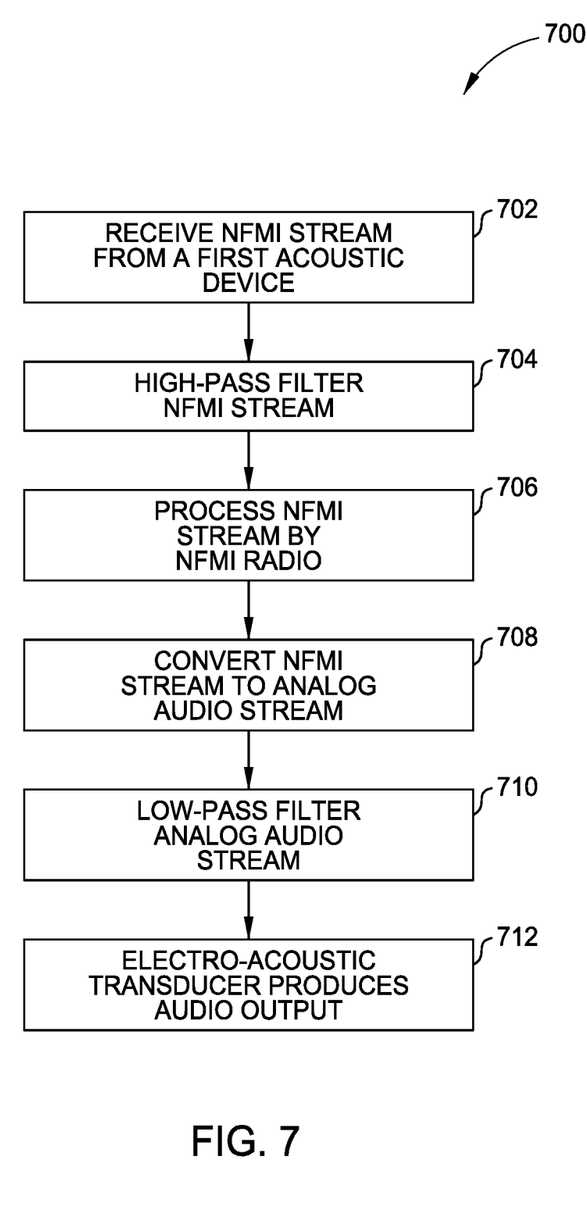
FIG. 7 illustrates example operations performed by a slave acoustic earbud including an electro-acoustic transducer configured to process an audio stream and an NFMI stream, in accordance with aspects of the present disclosure.

FIG. 7 illustrates example operations performed by a second acoustic device, receiving an NFMI stream from a first acoustic device. The second acoustic device includes a single electro-acoustic transducer for processing acoustic signals and NFMI signals.

At 702, the second acoustic device receives, via an electro-acoustic transducer, an NFMI stream from a first acoustic device. At 704, the NFMI stream passes through a high-pass filter to selectively block out-of-NFMI band interference and allow the NFMI stream to pass. At 706, the high-pass filtered NFMI stream is processed by an NFMI radio. The NFMI radio imposes a delay on the NFMI stream to synchronize playback at the first and second acoustic devices. At 708, after processing by the NFMI radio, the NFMI stream is converted to an analog audio stream by an audio codec. At 710, the analog audio stream passes through a low-pass filter to selectively block out-of-audio band interference and enable the analog audio stream to pass. At 712, the low-pass filtered analog audio stream is passed to the electro-acoustic transducer and the electro-acoustic transducer produces an audio output via mechanical vibrations.

Figure 8:
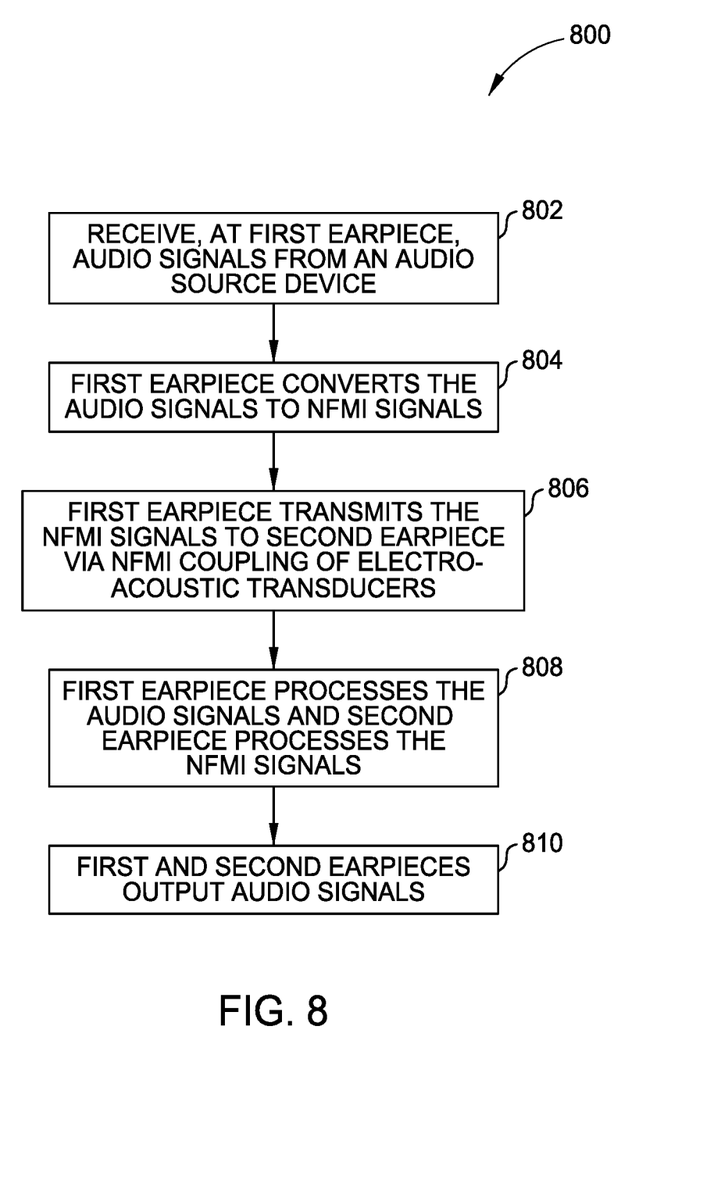
FIG. 8 illustrates example operations performed by an apparatus including first and second earbuds, in accordance with aspects of the present disclosure.

FIG. 8 illustrates example operations performed by an apparatus including a first earpiece and a second earpiece. Each of the earpieces has a single electro-acoustic transducer coil for processing acoustic and NFMI streams.

At 802, the first earpiece receives audio signals from an audio source device. At 804, the first earpiece converts the audio signals to NFMI signals. At 806, the first earpiece transmits the NFMI signals to the second earpiece via NFMI coupling of the electro-acoustic transducers. At 808, the audio signals are processed at the first earpiece and the NFMI signal is processed at the second earpiece to produce representations of the audio signals received from the audio source device. At 810, the first and second earpieces both output audio signals representing the audio signals received from the audio source device.

Aspects of the present disclosure provide an electro-acoustic transducer that serves as a transducer coil and an NFMI coil. By eliminating a dedicated NFMI coil, the mechanical design of an acoustic device is simplified and the body size of the acoustic device may be reduced. Advantageously, the acoustic transducer processes multiple signals occupying different frequencies.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. An apparatus comprising:
    a first acoustic device comprising a first electro-acoustic transducer; and
    a second acoustic device comprising a second electro-acoustic transducer,
    wherein the first and second electro-acoustic transducers are each configured to acoustically output audio signals and provide near-field magnetic induction (NFMI) coupling of the first electro-acoustic transducer and the second electro-acoustic transducer,
    wherein NFMI signals and the audio signals coexist on each of a coil of the first electro-acoustic transducer and on a coil of the second electro-acoustic transducer.

2. The apparatus of claim 1, further comprising:
    a wireless communication unit configured to communicate with one or more devices external to the apparatus.

3. The apparatus of claim 2, wherein the first acoustic device:

receives an audio signal from the one or more devices external to the apparatus;
processes the received audio signal to produce a first audio signal for output by the first electro-acoustic transducer; and
transmits a representation of the received audio signal to the second acoustic device via the NFMI coupling.

4. The apparatus of claim 3, further comprising:
processing circuitry at the first acoustic device configured to convert the received audio signal to the NFMI signals; and
processing circuitry at the second acoustic device configured to convert the NFMI signals, received via the NFMI coupling, to a second audio signal for output by the second electro-acoustic transducer.

5. The apparatus of claim 1, wherein the coil of the first electro-acoustic transducer and the coil of the second electro-acoustic transducer each comprise a magnetic coil, and the magnetic coils are each configured to transmit the audio signals via mechanical vibrations and the NFMI signals via magnetic coupling.

6. The apparatus of claim 1, wherein the first and second electro-acoustic transducers are configured to output synchronized audio signals.

7. The apparatus of claim 1, further comprising:
a first diplexer filter coupled to the first electro-acoustic transducer;
a second diplexer filter coupled to the second electro-acoustic transducer;
wherein the first diplexer filter is configured to selectively filter the audio signals and the NFMI signals so the audio signals and the NFMI signals coexist on the coil of the first electro-acoustic transducer and the second diplexer filter is configured to selectively filter the audio signals and the NFMI signals so the audio signals and the NFMI signals coexist on the coil of the second electro-acoustic transducer.

8. An apparatus comprising:
a first earpiece configured to receive audio signals from an external source device;
a near field magnetic induction (NFMI) radio at the first earpiece configured to convert the received audio signals to NFMI signals; and
a first electro-acoustic transducer at the first earpiece and a second electro-acoustic transducer at a second earpiece of the apparatus,
wherein the first electro-acoustic transducer is configured to transmit the NFMI signals to the second earpiece of the apparatus via magnetic coupling of the first electro-acoustic transducer and the second electro-acoustic transducer and wherein the first and second electro-acoustic transducers are further configured to output representations of the audio signals via mechanical vibrations,
wherein the audio signals and the NFMI signals coexist on each of a coil of the first electro-acoustic transducer and on a coil of the second electro-acoustic transducer.

9. The apparatus of claim 8, further comprising:
a filter at the first earpiece configured to high-pass filter the NFMI signals, wherein the first electro-acoustic transducer is configured to transmit the high-pass filtered NFMI signals to the second earpiece of the apparatus via the magnetic coupling.

10. The apparatus of claim 8, further comprising:
a first filter at the second earpiece configured to high-pass filter the NFMI signals; and
an audio codec at the second earpiece configured to convert the high-pass filtered NFMI signals to a first audio signal, wherein the representations of the audio signals comprise the first audio signal.

11. The apparatus of claim 10, further comprising:
a second filter at the second earpiece configured to low-pass filter the audio signals to generate low-pass filtered audio signals, wherein the representations of the audio signals comprise the low-pass filtered audio signals.

12. The apparatus of claim 8, wherein the representations of the audio signals output by the first electro-acoustic transducer are synchronized with the representations of the audio signals output by the second electro-acoustic transducer.

13. A method for outputting audio signals by an apparatus comprising:
receiving audio signals from an audio source device at a first earpiece of the apparatus;
converting the audio signals to near field magnetic induction (NFMI) signals;
transmitting the NFMI signals, by the first earpiece to a second earpiece of the apparatus via NFMI coupling of a first electro-acoustic transducer at the first earpiece and a second electro-acoustic transducer at the second earpiece; and
processing the audio signals at the first earpiece and the NFMI signals at the second earpiece to produce representations of the audio signals for output at each of the first and second earpieces,
wherein the processing at the first earpiece comprises:
converting the received audio signals to analog audio signals for output by the first electro-acoustic transducer; and
selectively filtering the analog audio signals and the NFMI signals so the analog audio signals and the NFMI signals coexist on a coil of the first electro-acoustic transducer.

14. The method of claim 13, wherein the selective filtering comprises passing the received analog audio signals and the NFMI signals through a diplexer.

15. The method of claim 14, wherein the audio signals comprise signals in a frequency range of approximately 100 Hz to approximately 16 kHz and the NFMI signals comprise signals in a frequency range of approximately 10 MHz to approximately 15 MHz.

16. The method of claim 13, wherein the processing at the second earpiece comprises:
converting the NFMI signals to analog audio signals for output by the second electro-acoustic transducer; and
selectively filtering the analog audio signals and the NFMI signals so the analog audio signals and the NFMI signals coexist on the coil of the second electro-acoustic transducer.

17. The method of claim 16, wherein the selective filtering comprises passing the analog audio signals and the NFMI signals through a diplexer.

18. The method of claim 17, wherein the audio signals comprise signals in a frequency range of approximately 100 Hz to approximately 16 kHz and the NFMI signals comprise signals in a frequency range of approximately 10 MHz to approximately 15 MHz.

19. The method of claim 13, wherein the representations of the audio signals output by the first earpiece are synchronized with the representations of the audio signals output by the second earpiece.

* * * * *